Oct. 10, 1961 H. J. FINDLEY 3,003,372
APPARATUS FOR CUTTING MATERIAL
Filed Sept. 29, 1959 5 Sheets-Sheet 2

INVENTOR.
HOWARD J. FINDLEY
BY Hudson, Boughton,
Willis, David & Hoffmann
ATTORNEYS

INVENTOR.
HOWARD J. FINDLEY
ATTORNEYS

Oct. 10, 1961  H. J. FINDLEY  3,003,372
APPARATUS FOR CUTTING MATERIAL
Filed Sept. 29, 1959  5 Sheets-Sheet 4

INVENTOR.
HOWARD J. FINDLEY
BY Hudson, Coughton,
Williams, David & Hoffmann
ATTORNEYS

United States Patent Office 3,003,372
Patented Oct. 10, 1961

3,003,372
APPARATUS FOR CUTTING MATERIAL
Howard J. Findley, 995 Richmond Road, Lyndhurst, Ohio
Filed Sept. 29, 1959, Ser. No. 843,148
24 Claims. (Cl. 77—32.3)

This invention relates to the removal of material from workpieces by cutting, drilling, machining or other such procedures employing a rotating cutting tool and, as one of its objects, provides novel apparatus by which the removal can either be carried out at a faster rate than heretofore or can be carried out at the present normal rate with a correspondingly longer tool life, and the use of which apparatus will consume less power and will result in the formation of cuttings or chips of a small size and broken character adapted to be readily collected and not likely to cause personal injury.

Another object is to provide novel apparatus for the removal of material from a workpiece by a rotating cutting tool to which a rapid short-stroke vibratory movement is imparted during the rotative cutting action thereof. In addition to causing an automatic breaking of the chips or cuttings produced, the vibratory movement causes the pressure of the tool against the workpiece to be intermittently relieved, at least partially, and this results in more effective cooling and a longer useful life of the tool by facilitating the entry of coolant fluid between the workpiece and the cutting portion of the tool.

A further object is to provide such novel apparatus for the removal of material from a workpiece and wherein the vibratory movement imparted to the tool is along the rotation axis thereof.

Still another object is to provide such novel apparatus for the removal of material from a workpiece and wherein the vibratory movement is a resonant vibratory movement.

This invention also provides novel apparatus for the removal of material from a workpiece by a rotatable cutting tool to which vibratory movement is applied by vibration generating means having cooperating vibratory members located on the rotation axis.

Additionally this invention provides novel apparatus of the character referred to above wherein fork means is associated with, or forms a part of, the vibration generator for achieving a resonant vibratory action.

Other objects and advantages of this invention will be apparent in the following detailed description and in the accompanying drawings form part of this specification and in which.

The apparatus of this invention provide for the removal of material from a workpiece by cutting, drilling, machining, or other such procedures employing a rotatable cutting tool to which a rapid vibratory movement is imparted during the rotation of the tool. The vibratory movement can be imparted to the tool along the rotation axis thereof, or transversely to the rotation axis, and can be of any suitable frequency and amplitude depending upon the results desired to be achieved and the characteristics of the tool and of the workpiece being operated upon.

Figures 1, 2:
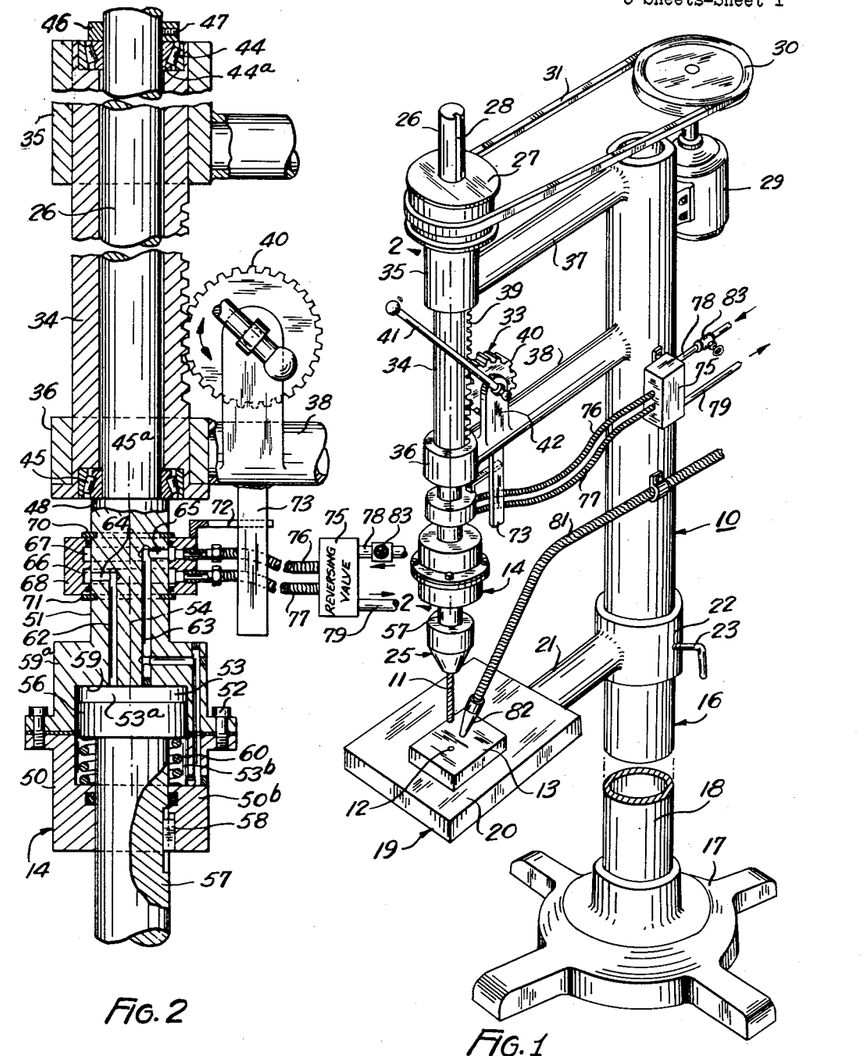
FIG. 1 is an elevational view in perspective showing apparatus embodying the invention.
FIG. 2 is a partial axial section on a larger scale and taken through the feed mechanism and vibration generator portions of the apparatus of FIG. 1, as indicated by section line 2—2 thereof.

FIGS. 1 and 2 of the drawings show a machine 10 of the drill press type by which this invention can be carried out to advantage and which employs a rotatable cutting tool or bit 11, here shown as being of the twist drill type, and which tool is operable to drill, ream, or otherwise form a hole 12 in a workpiece 13. Vibratory movement is imparted to the tool 11 during the rotation thereof, in this case a vibratory movement along the rotation axis of the tool, by a vibration generator 14 which will be described hereinafter and through which the rotative movement or driving torque is transmitted to the tool.

The machine 10 is provided with a suitable frame 16 which is here shown as comprising a base 17 and a standard or column 18 rising therefrom. A workholder means 19 is provided on the machine and is here shown as comprising a support table 20 adapted to receive the workpiece 13 thereon and which table is mounted on the column 18 by means of a bracket 21 or the like having a sleeve portion 22 shiftable along the column for locating the work support means at the desired height. A clamping screw or the like 23 provided in the sleeve portion 22 is clampingly engageable with the column 16 for retaining the workholder means 19 at the selected height to which it has been adjusted along the column.

The machine 10 also includes toolholder means 25 which is here shown in the form of a chuck or the like adapted to receive and grip the stem of the tool 11. A driving means for the tool 11 is provided on the machine 10 in the form of a rotatable drive shaft 26 slidably movable in a driven pulley 27 to which it is connected by means of a key or spline engaged in a keyway 28. The pulley 27 is rotatably driven, as by an electric motor 29 suitably mounted on the column 16 and having a drive pulley 30 to which the driven pulley 27 is connected by a belt 31 extending around these pulleys.

The machine 10 also includes suitable feed means 33 providing for a relative feeding movement between the tool 11 and the workpiece 13 for maintaining the tool in cutting relation to the workpiece. The feeding means 33 is here shown as comprising a nonrotatable feed sleeve or quill shaft 34 axially slidable in a pair of spaced upper and lower bearings 35 and 36 provided on a pair of upper and lower support arms 37 and 38 projecting laterally from the column 18. The feeding means 33 also comprises a rack 39 on the feed sleeve 34 and a drive gear 40 meshed with the rack and supported by the arm 38 so as to be manually rotatable by means of a handle or bar 41. Rotation of the gear 40 by the handle 41 will cause lifting or lowering of the feed sleeve 34 by which the tool 11 can be retracted or advanced relative to the workpiece 13. The gear 40 is here shown as being rotatably mounted on the support arm 38 by suitable bracket means 42.

The drive shaft 26 extends through the feed sleeve 34 and, as shown in FIG. 2, is rotatably positioned in the latter by a pair of upper and lower antifriction bearings 44 and 45. Axial feeding movement is imparted to the shaft 26 by the feed sleeve 34 through the engagement of the inner races 44$^a$ and 45$^a$ of the bearings 44 and 45 with shoulder means provided on the shaft. The shoulder which is engageable by the bearing race 44$^a$ is here shown as being a collar 46 secured to the shaft 26 by a set screw 47 and the shoulder engageable by the bearing race 45$^a$ is here shown as being an integral annular shoulder 48 provided on the shaft.

The vibration generator 14 is associated with, or incorporated in, the drive shaft 26 and is here shown as being located between the feed sleeve 34 and the toolholder 25. The vibration generator 14 can assume various forms and can be operated by vibration power medium of various kinds. In the machine 10 the vibration generator 14 is a fluid pressure responsive device to which a suitable pressure fluid, preferably hydraulic, is supplied from an available source.

The vibration generator 14 is here shown as comprising a housing 50 formed by connected upper and lower housing sections 50$^a$ and 50$^b$ of which the upper housing section is connected with, or formed on, the enlarged lower shaft portion 51 of the drive shaft 26. The housing sections 50$^a$ and 50$^b$ are hollow or cup-shaped and have their adjacent open ends secured together as by means of clamping screws 52 extending through companion flanges so that the recesses of these sections define a cylinder 53 whose longitudinal axis is substantially coincident with the rotation axis 54 of the shaft 26 and which is also a common rotation axis for the tool 11.

As shown in FIG. 2, the vibration generator 14 also comprises a piston 56 slidably operable in the cylinder 53 so as to divide the latter into upper and lower piston chambers 53$^a$ and 53$^b$. The piston 56 includes a piston rod which projects through the lower housing section 50$^b$ and forms a tool spindle 57 on which the toolholder 25 is mounted. The piston 56 and the tool spindle 57 are rotatable with the housing 50 of the vibration generator 14 so as to transmit driving torque to the toolholder 25 and, for this purpose, the tool spindle 57 is keyed or splined to the housing member 50$^b$ as by means of a suitable key or the like 58.

The housing and piston members 50 and 56 form a pair of cooperating relatively movable vibrator members located on, and movable along, the rotation axis 54 for producing the vibratory movement which is imparted to the tool 11. The transverse upper end wall of the cylinder chamber 53$^a$ forms an axially facing abutment surface 59 toward which the piston 56 is urged by a compression spring 60 located in the lower piston chamber 53$^b$. During downward axial feeding movement of the feed sleeve 34 by the gear 40, the abutment surface 59 transmits downward axial feeding movement to the spindle 57, either by direct engagement of such abutment surface with the piston 56, or through an intervening body of fluid present in the cylinder chamber 53$^a$, to thereby cause axial feeding movement of the tool 11 against and into the workpiece 13 while the tool is being rotated.

The vibratory movement imparted to the tool 11 is a short-stroke rapid vibratory movement produced by a fluid actuated reciprocating movement of the piston 56 in the cylinder 53. For this purpose the housing 50 of the vibration generator 14 is provided with a pair of fluid passages 62 and 63 whose lower ends communicate respectively with the upper and lower cylinder chambers 53$^a$ and 53$^b$. Since the fluid pressure connections extend to both ends of the cylinder 53 the vibration generator 14 is double-acting in character and the compression spring 60 can accordingly be omitted.

The portions of the passages 62 and 63 which extend through the shaft portion 51 are provided at their upper ends with radial passage portions 64 and 65 forming control ports opening through the shaft portion 51 and communicating, respectively, with annular grooves 66 and 67 of a stationary collar 68 which surrounds this shaft portion. The collar 68 is axially positioned on the shaft portion 51, as by suitable snap rings or the like 70 and 71, and is prevented from rotating with this shaft portion as by means of a holding finger 72 engageable with a stop lug 73 provided on the support arm 38.

For controlling the actuation of the piston 57 by the vibration power fluid medium supplied thereto a suitable valve mechanism is provided, such as a conventional form of self-energized reversing valve 75, which is connected with the grooves 66 and 67 of the collar 68 by a pair of flexible conduits 76 and 77. The reversing valve 75 can be mounted on a suitable portion of the machine 10, such as on the column 16 as shown in FIG. 1, and is connected with the available source of pressure fluid by a supply conduit 78. An exhaust conduit 79 leading from this valve device conducts therefrom the exhaust fluid being returned from the cylinder 53.

From the construction of the machine 10 and the arrangement of the components thereof as described above, it will now be understood that while the tool 11 is being rotated in cutting engagement with the workpiece 13 and is being advanced into the workpiece by feeding movement supplied to the tool by downward axial movement of the feed sleeve 34, a rapid short-stroke vibratory movement will be imparted to the tool by the vibration generator 14 when the latter is energized or activated by a suitable value of pressure fluid supplied thereto through the conduit 78 and the reversing valve 75. When the pressure fluid supply is connected with the upper cylinder chamber 53$^a$ by the reversing valve and the passage 63, the piston 56 will be moved downwardly against the action of the spring 60 to produce a downward excursion of the vibratory movement being applied to the tool 11. Similarly, when the pressure fluid source is connected with the lower cylinder chamber 53$^b$ by the reversing valve 75 and the passage 63, the piston 56 will be moved upwardly to cause an upward excursion of the vibratory movement being imparted to the tool 11.

The flow reversing action of the valve 75 will cause a rapid reversal of the pressure fluid supply to the opposite ends of the cylinder 53 to thereby cause the vibration excursions or oscillations of the piston 56 and of the tool 11 to take place at a corresponding rapid rate. The operating characteristics of the reversing valve 75 will determine to a major extent the vibration rate of the vibratory movement being imparted to the tool 11, and the pressure of the fluid supply to the cylinder 53 will determine to a major extent the amplitude of the excursions of the vibratory movement. The characteristics of the valve 75 and the pressure value of the motive fluid for the cylinder 53 can be selected or varied to produce the vibratory movement desired for the tool 11 and this vibratory movement can accordingly have any desired or predetermined frequency and amplitude, and the frequency of the vibratory movement can be either a resonant vibration frequency or a nonresonant vibration frequency.

It will be recognized, of course, that when the reversing valve 75 connects the fluid pressure supply conduits 78 with one end of the cylinder 53, the opposite end of the cylinder will be connected with the exhaust conduit 79, and vice versa.

The vibratory movement imparted to the tool 11 also 11 during the cutting operation thereof on the workpiece 13, as described above, will produce a desired chip-breaking effect on the cuttings representing the material removed from the workpiece by the tool. As the result of this chip-breaking action the removed material, which in the conventional drilling operation is usually in the form of a long spiral strand or strip, occurs in the form of small individual chips which can be readily collected and handled and are not likely to cause personal injury and cannot become twisted and tangled around and about the tool 11 as frequently occurs when the removed material is in the form of the continuous strand or strip just mentioned above.

The vibratory movement which is imparted to the tool facilitates the cooling of the cutting portion or portions of the tool by intermittently relieving, or partially relieving, the pressure of the cutting portions against the workpiece. Such intermittent relieving of the pressure of the tool 11 against the workpiece 13 will facilitate the entry of cooling fluid between the tool and workpiece, such as a liquid coolant in the form of a suitable cutting oil or the like supplied to the tool through a flexible conduit 81 having a discharge nozzle 82 located adjacent the point of engagement of the workpiece by the tool.

The machine 10 can be used with the vibration generator 14 operating continuously whenever the machine is in operation or, if desired, the action of the vibration generator can be stopped whenever it is desirable to operate the machine 10 without the benefit of the vibratory movement of the tool. To thus render the vibration generator 14 inoperative, a suitable shut-off valve 83 is provided in the supply conduit 78 leading to the reversing valve 75.

Various other advantages result from the vibratory movement imparted to the tool 11 and among which can be mentioned the fact that the useful life of the tool will be considerably prolonged for a given cutting speed thereof or, for a specified tool life, the material can be removed from the workpiece 13 at a much more rapid rate than has heretofore been possible. The vibratory movement of the tool 11 also results in a lower power consumption by the machine 10 because there is less power lost in the generation of heat by the cutting action.

Figures 3, 4, 5, 6, 7, 8:
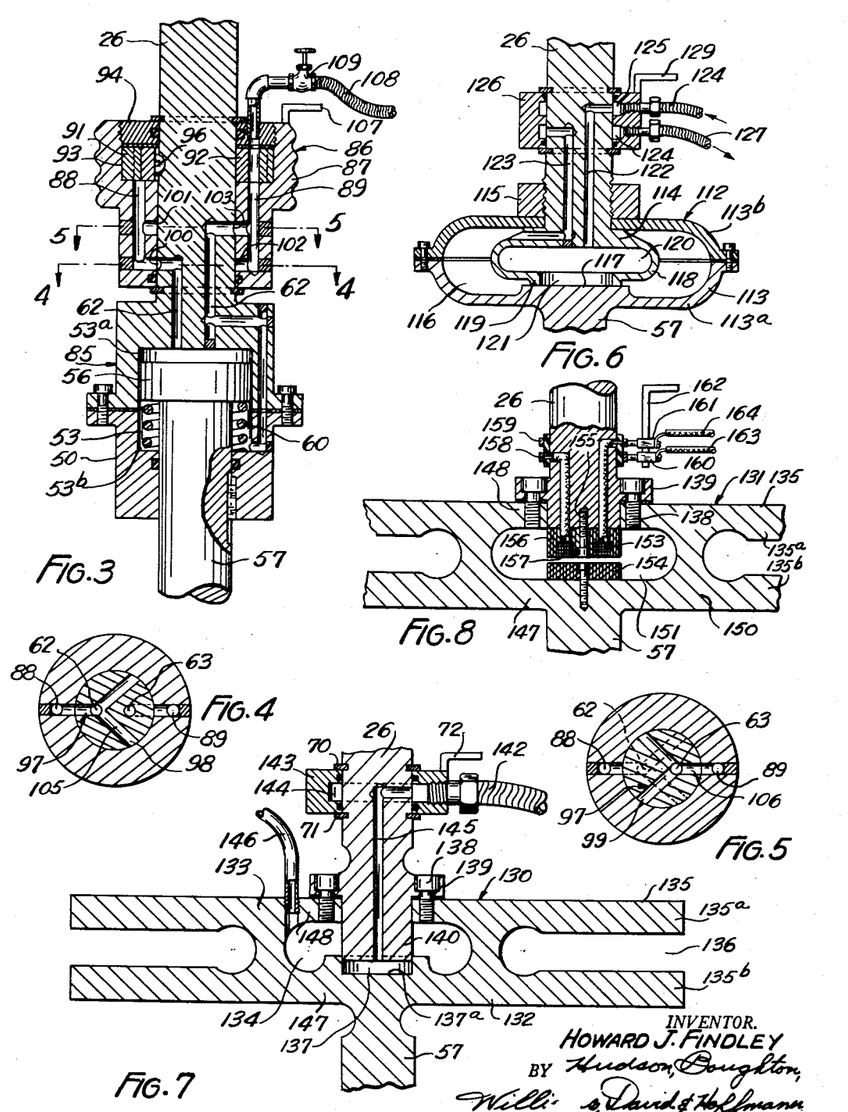
FIG. 3 is a partial axial section similar to that of FIG. 2 and showing a first modified form of vibration generator.
FIGS. 4 and 5 are transverse sections taken respectively on section lines 4—4 and 5—5 of FIG. 3 and showing reversing valve means of such first modified form of vibration generator.
FIGS. 6 and 7 are partial axial sections showing, respectively, second and third modified forms of fluid pressure actuated vibration generators.
FIG. 8 is another such partial axial section showing a fourth modified form of vibration generator and which is electrically actuated.

FIGS. 3, 4 and 5 of the drawings show a modified form of vibration generator 85 intended for use in a manner and location similar to the vibration generator 14 described above. The vibration generator 85 comprises the same housing and piston members 50 and 56 and includes the above-mentioned pair of fluid passages 62 and 63 provided in the housing 50 and communicating with the upper and lower ends of the cylinder 53.

The vibration power medium for the vibration generator 85 is supplied thereto by a pump device 86 which is driven from the shaft 26. The pump device 86, as here shown, comprises a stationary pump housing 87 having discharge and intake passages 88 and 89 therein. The pump device 86 is here shown as being of the gear type and also comprises co-operating outer and inner gear members 91 and 92 which are in a meshed engagement for defining pumping chambers in communication with the discharge and intake passages 88 and 89. The gear members 91 and 92 are rotatable in such meshed engagement in a cylinder 93 provided in the pump housing 87 and which cylinder is closed at one end thereof by a suitable cover member 94. The inner gear member 92 is an external gear connected with the shaft 26 to be driven thereby, as by means of a key 96, and the outer gear 91 is an internal gear driven by the meshed engagement of the inner gear therewith.

The discharge and intake passages 88 and 89 of the pump device 86 are connected with the passages 62 and 63 of the vibration generator 85 through a reversing valve means 97. The reversing valve means 97 is here shown as being of the rotary type comprising lower and upper groups of radial control ports 98 and 99 provided in the shaft 26 and such groups lying, respectively, in the same axially spaced transverse planes as pairs of lower and upper radial connecting ports 100, 101 and 102, 103 of the delivery and intake passages 88 and 89. Inasmuch as the radial ports 100 and 101 are portions of the pump discharge passage 88 they constitute pressure fluid supply ports for the cylinder 53, and likewise, the radial ports 102 and 103 being portions of the intake passage 89 they constitute return ports for the cylinder 53. The radial ports 98 and 99 comprise, in this case, three such ports in each group and are spaced apart around the shaft 26 at angular distances of 120°. The radial ports 98 are located on the shaft 26 so as to lie in a staggered relation to the radial ports 99.

The radial ports 98 are connected with the axial cylinder passage 62 by transverse connecting passages 105 of the shaft 26 and the radial ports 99 are connected with the axial cylinder passage 63 by similar transverse connecting passages 106. The pair of radial ports 100 and 101 of the pump housing 87 are in a diametrically opposed or 180° spaced relation to the radial ports 102 and 103 of the pump housing and, consequently, the radial ports 98 and 99 of the shaft 26 will come into register with the ports 100, 102 and 101, 103 only during rotation of the shaft.

In FIGS. 3, 4 and 5 of the drawings the cylinder chamber 53ª is in communication with the discharge passage 88 of the pump 86 by reason of the communication of one of the radial ports 98 with the pressure fluid supply port 100 of the pump housing 87. At this time, the cylinder chamber 53ᵇ is in communication with the intake passage 89 of the pump 86 by reason of the communication of one of the radial ports 99 with the port 103 of the pump housing. Rotation of the shaft 26 through an angular distance of 60° will reverse the communicating relation of the ports referred to just above, that is to say, one of the radial ports 98 will then be in register with the port 102 of the pump housing 87 to connect the cylinder chamber 53ª with the intake passage 89; and one of the radial ports 99 will then be in register with the port 101 of the pump housing to thereby connect the cylinder chamber 53ᵇ with the discharge passage 88.

This repeated reversal of the relationship of the communication between the pump discharge and intake passages 88 and 89 and the passages 62 and 63 leading to the opposite ends of the cylinder 53 will cause pressure fluid to be supplied alternately to the ends of the cylinder and the previously supplied pressure fluid to likewise be exhausted alternately from opposite ends to thereby reciprocate the piston 56 in the cylinder with a rapid short-stroke vibratory movement. This vibratory movement is transmitted by the tool spindle 57 to the tool 11 while the latter is being rotated in cutting relation to the workpiece 13.

Rotation of the pump housing 87 is prevented as by means of a holding finger 107 projecting therefrom and engageable with the stop lug 73 of the frame 16. The pump device 86 and the cylinder 53 can be charged or maintained filled with motive fluid, such as a suitable hydraulic fluid, through a supply conduit 108 which is connected with the intake side of this pump device through a shut-off valve 109.

The operation of the vibration generator 85, when supplied with pressure fluid by the pump device 86 during the rotation of the tool 11, vibrates the latter in the same manner and for the achievement of the same advantageous results as have already been explained above for the vibration generator 14.

FIG. 6 of the drawings shows another vibration generator 112 which can be used in the machine 10 in the same location and for the same purpose as the vibration generator 14 described above. The vibration generator 112 comprises a housing 113 located on the upper end of the tool spindle 57 and forming a torque transmitting connection between the drive shaft 26 and such tool spindle. The housing 113 is formed by connected lower and upper housing sections 113ª and 113ᵇ of limited flexibility and of which the lower housing section is here shown as formed integral with the tool spindle 57. The upper housing section is here shown as being clamped against a head portion 114 of the shaft 26 by a clamping nut 115. The housing 113 contains an outer chamber 116 which serves as an exhaust chamber for the vibration power motive fluid, as will be further explained hereinafter.

The lower housing section 113ª is provided on the inner side thereof with an axially facing abutment surface or valve seat 117 which is located in a substantially opposed relation to the head portion 114. A flexible tubular extension 118 is formed on, or carried by, the head portion 114 and constitutes a valve member whose free end or lip 119 is normally in a valve-closed engagement with the seat 117. The flexible valve member 118 defines an inner fluid pressure chamber 120 within the housing 113 and includes an end opening 121 for such pressure chamber. The pressure chamber 120 is disconnected from the exhaust chamber 116 whenever the lip 119 of the flexible valve member 118 is in engagement with the seat 117, and conversely, is connected with such exhaust chamber whenever the lip 119 and the seat 117 are in a separated relation.

Motive fluid supply and exhaust passages 122 and 123 are provided in the shaft 26 and have their inner or lower ends connected respectively with the pressure chamber 120 and the exhaust chamber 116. Pressure fluid from an available source is supplied to the outer or upper end of the passage 122 through a supply conduit 124 and the annular groove 125 of a nonrotatable collar 126 surrounding the shaft 26. An exhaust conduit 127 communicates with the outer or upper end of the exhaust passage 123 through the annular groove 128 of the collar 126. The collar 126 is held against rotation as by means of a holding finger 129 projecting therefrom and engaged with the stop 73 of the machine frame.

When pressure fluid of a suitable value is supplied to the inner chamber 120 of the vibration generator 112, it subjects the flexible valve member 118 to an internal expansive pressure and also acts directly against the exposed surface portion of the seat 117. The action of the pressure fluid in the chamber 120 thus causes an axial movement of the lip 119 and of the seat 117 but the axial movement of the seat is greater than that of the lip by reason of the flexibility of the walls of the housing sections 113ª and 113ᵇ, and consequently, the seat separates from the lip to produce a valve-open condition for the valve member 118. Some of the pressure fluid of the chamber 120 thereupon flows through the end opening 121 by passing between the lip and seat into the exhaust chamber 116, thereby reducing or relieving the pressure and expensive action of fluid in the hollow valve member 118 and against the seat 117. This permits retraction or contraction of the valve member and of the housing 113 and results in the lip 119 being re-engaged against the seat 117 to interrupt the communication into the exhaust chamber. Following the reengagement of the lip 119 against the seat 117, the fluid pressure in the chamber 120 again builds up to produce another cycle of operation of the vibration generator 112.

This intermittent thrust action of the pressure fluid against the seat 117 and the action of the valve member 118 in thus connecting and disconnecting the pressure chamber 120 and the exhaust chamber 116 results in a repeated flexing of the housing 113 at a rate to produce a rapid short-stroke vibratory movement of the toolholder spindle 57 for causing the desired rapid vibration of the tool 11. The rate or frequency of the vibratory movement produced by the vibration generator 112 will depend primarily upon the characteristics of the housing 113 and of the flexible valve member 118. The amplitude of the vibratory movement will depend, to a major extent, upon the pressure of the motive fluid being supplied to the chamber 120. The vibratory movement produced by the vibration generator 112 and applied to the tool 11 accomplishes the advantages already explained above and can be either a resonant vibratory movement or a nonresonant vibratory movement.

FIGS. 7 and 8 of the drawings show vibration generators 130 and 131 which can be used in the machine 10 in the same location as the vibration generator 14 and which will operate to produce a resonant vibratory action.

The vibration generator 130 of FIG. 7 comprises a housing 132 mounted on, or formed integral with, the upper end of the tool spindle 57 and having a central hub portion 133 containing a chamber 134 which serves as an exhaust chamber for motive fluid supplied to this vibration generator. The housing 132 also comprises a fork portion 135 having spaced fork arms 135ª and 135ᵇ with free ends and separated by an intervening space 136. The fork arms 135ª and 135ᵇ can be in the form of individual parallel arms projecting from the central hub portion 133 and extending for only a portion of the circumference of the housing 132, or, if desired, can be radially projecting annular or disk portions of such housing.

The hub portion 133 comprises axially spaced wall portion 147 and 148 forming the end walls of the chamber 134. The housing 132 is provided on one axial side of the chamber 134 with a pocket or valve cylinder 137 facing toward the drive shaft 26 and extending into the wall portion 147 so as to lie on the common rotation axis. The housing 132 is attached to the shaft 26 to be driven thereby, as by means of clamping screws 138 extending through a flange 139 carried by such shaft. The end portion of the shaft 26 projects into the housing 132 so as to extend axially across the chamber 134 and forms a valve plunger 140 which is slidably engaged in the valve cylinder 137. The valve cylinder 137 and the valve plunger 140 constitute a pair of cooperating axially opposed vibrator members with the end wall 137ª of the valve cylinder forming an abutment surface.

Motive fluid of a suitable character and pressure value is supplied to the vibration generator 130 by a conduit 142 connected with a non-rotatable collar 143 surrounding the shaft 26. The collar 143 is provided with an internal groove 144 with which the supply conduit 142 communicates and which, in turn, communicates with a passage 145 formed in the shaft 26 and leading to the valve cylinder 137 through the valve plunger 140. The valve plunger 140 overlaps the edge of the open end of the valve cylinder 137 so as to normally occupy a valve-closed position and disconnect the valve cylinder from the exhaust chamber 134.

When the pressure of the motive fluid supplied to the valve cylinder 137 builds up in the latter, it pushes against the end face of the valve plunger 140 and moves the latter outwardly of the valve cylinder to a valve-open condition thereby connecting the valve cylinder with the exhaust chamber 134 to permit the flow of fluid into the latter. This expansive action of the fluid in the valve cylinder 137 in thus moving the valve plunger 140 in an outward or upward axial direction forcibly flexes the wall portions 147 and 148 of the housing 132, and conversely, the relief of the pressure of the fluid in the valve cylinder 137 permits the previously flexed portions of the housing to move the valve plunger 140 in an inward or downward axial direction thereby returning the same to its valve-closed position in the valve cylinder. The repeated opening and closing movements of the valve plunger 140 and the corresponding flexing of the housing 132 produces a rapid short-stroke vibratory movement of the tool spindle 57 and the tool 11.

The exhaust fluid escapes from the exhaust chamber 134 through a suitable exhaust conduit 146 connected with the latter. The collar 143 is axially positioned on the shaft 26 as by means of the snap rings 70 and 71 and is held against rotation by the holding finger 72 which projects from the collar and is engageable with the stop lug 73 of the frame 16.

The fork arms 135ᵃ and 135ᵇ are so formed that they will be of a flexible character and will have a given or predetermined resonant vibration frequency. These arms are set in vibration by the vibratory movement resulting from the flexing of the wall portions 147 and 148 produced by the pressure fluid under the control of the valve plunger 140. The flexibility of the wall portions 147 and 148 is such, in relation to the extent of valve overlap of the valve plunger 140, that the vibratory movement generated in response to a given pressure value of the motive fluid supplied by the conduit 142 will result in vibration of the fork arms 135ᵃ and 135ᵇ at their resonant frequency. The vibratory movement produced by the flexing of the housing 132 can be varied to some extent by suitably varying the pressure of the motive fluid being supplied through the conduit 142 so that the vibration of the fork arms at the resonant frequency can be achieved.

The vibration generator 131 of FIG. 8 comprises a housing 150 of a form similar to the above-described housing 132 in that it has a chamber 151 in the central hub portion 133 thereof and has a similar forked portion 135 comprising spaced form arms 135ᵃ and 135ᵇ. The housing 150 is formed on, or connected with, the upper end of the tool spindle 57 and is attached to the flange 139 of the lower end of the drive shaft 26 by means of the screws 138. The hub portion 133 has axially spaced wall portions 147 and 148 which form the end walls of the chamber 151.

The vibration generator 131 also comprises cooperating vibrator members 153 and 154 located in the chamber 151 in an axially opposed relation on the common rotation axis. The vibrator member 153 is in the form of an electromagnet secured against the end face of the shaft 26 as by a mounting screw 155 and comprising a suitable laminated magnet core 156 and an energizing coil 157 on the core. The vibrator member 154 comprises an armature for the electromagnet 153 and is here shown as being a laminated axial projection attached to the housing wall 147 and extending axially into the chamber 151.

The magnet coil 157 has end leads extending therefrom through passages of the shaft 26 and connected with a pair of slip rings 158 and 159 which are mounted on the shaft 26 in an insulated relation thereto. Brush holders 160 and 161 mounted on a suitable bracket 162 of the machine frame 16 support a pair of brushes in contact with the slip rings and have current supply conductors 163 and 164 connected therewith.

The electromagnet 153 is energized by supplying alternating current of a desired frequency to the magnet coil 157, or a pulsating current of a suitable pulse frequency, so that closing and separating movements between the core 153 and the armature 154 take place with a corresponding flexing of the wall portions 147 and 148 of the housing 150. These movements cause the fork arms 135ᵃ and 135ᵇ to be set in vibration at their resonant frequency and the desired short-stroke rapid vibratory movement is applied to the tool 11. By varying the energization of the electromagnet 153 in relation to the resiliency of the housing 150, the vibratory action can be made to achieve the resonant condition just mentioned for the vibratory movement of the fork arms 135ᵃ and 135ᵇ.

Figures 9, 20:
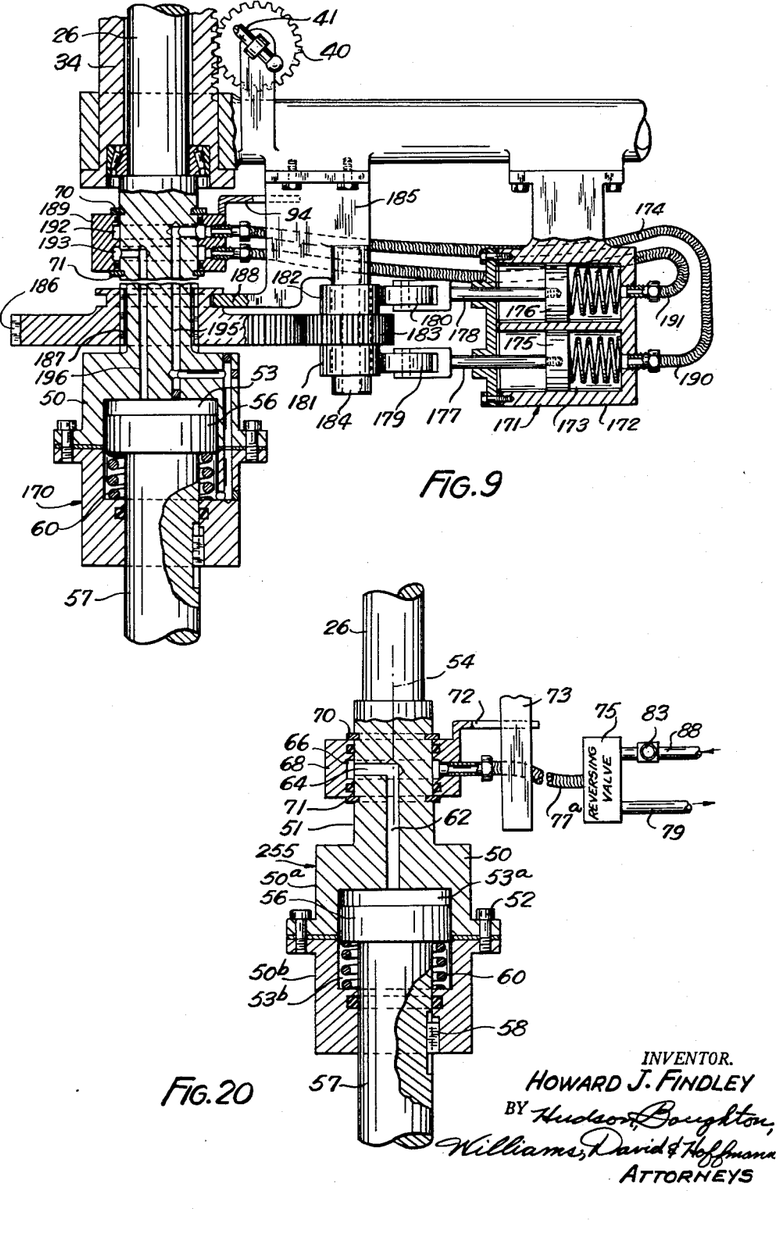
FIG. 9 is another partial axial section showing a fifth modified form of vibration generator and which embodies plunger type pump means.
FIG. 20 is a partial axial section similar to that of FIG. 2 but showing an additional modified form of vibration generator.

In FIG. 9 of the drawings another modified form of vibration generator 170 is shown and to which motive fluid is supplied by a pump device 171 driven from the shaft 26. The vibration generator 170 is of the same form of construction as the above-described vibration generators 14 and 85 in that it comprises co-operating vibrator members in the form of the housing 50 and the piston 56 slidable in the cylinder 53 of the housing. The vibration generator 170 is usable in the same location as the vibration generator 14 and accomplishes the same purposes in vibrating the tool 11 during the removal of material from the workpiece 13.

The pumping device 171 is of the plunger type and comprises a pump housing 172 having pump cylinders or chambers 173 and 174 therein and plungers 175 and 176 slidably operable in such cylinders. The plungers 175 and 176 are connected with plunger rods 177 and 178 which project from the pump cylinders and which rods have rollers 179 and 180 mounted on their outer ends as cam followers for co-operation with a pair of actuating cams 181 and 182.

The actuating cams 181 and 182 are connected with, and located on opposite sides of, a gear 183 which is rotatably supported by a stud or the like 184 projecting from a mounting bracket 185. The gear 183 is in meshed engagement with, and driven by, a gear 186 which is rotated by the drive shaft 26. The gear 186 is rotatably supported and held against axial shifting by a yoke portion 188 of the bracket 185. The hub of the gear 186 has a splined connection 187 with the drive shaft 26 so that the shaft will be slidable through the gear during tool feeding and retracting movements of the shaft produced by the manipulation of the feed lever 41.

The pump cylinders 173 and 174 are connected with a collar 189 by a pair of flexible conduits 190 and 191 so as to communicate with a pair of internal annular grooves 192 and 193 provided in the collar. The collar 189 is axially positioned on the shaft 26 by a pair of snap rings 70 and 71 and is held against rotation by a holding finger 194 projecting from the collar and engageable with the support bracket 185. Fluid passages 195 and 196 formed in the shaft 26 connect the grooves 192 and 193 of the collar with the opposite ends of the cylinder 53 of the vibration generator 170.

From the construction just described above for the vibration generator 170 and its associated pumping device 171, it will be seen that when the shaft 26 is driven to rotate the tool 11 in cutting engagement with the workpiece 13, the pump device 171 will also be driven from the shaft 26 and will cause fluid pressure pulsations to be supplied alternately to the chambers 53ᵃ and 53ᵇ of the cylinder 53. This is achieved by reason of the fact that the annular relation of the cams 181 and 182 is such that when the pump plunger 175 is making a forward or pumping stroke, the pump plunger 176 will be making a return stroke. The intermittent fluid pressure pulsations thus supplied to opposite ends of the cylinder 53 alternately will actuate the piston 56 to produce a rapid short-stroke vibratory movement of the tool 11. The spline connection between the gear 186 and the shaft 26 permits the axial feeding movement of the latter.

A desired frequency for the vibratory movement can be obtained by appropriately selecting the gear ratio for the cooperating gears 183 and 186 and by also providing the cams 181 and 182 with an appropriate contour. The cams 181 and 182 can be single lobe or multiple lobe cams depending upon the vibration frequency desired to be obtained. The vibration generator 170 can be operated with either a resonant or nonresonant vibration frequency and the amplitude of the vibratory movement can be controlled or varied by controlling or varying the pressure of the motive fluid supplied to the ends of the cylinder 53 by the pump cylinders 173 and 174. The vibration generator 170 is intended for use in the same location and for the accomplishment of the same beneficial results as the above-described vibration generator 14.

Figure 10:
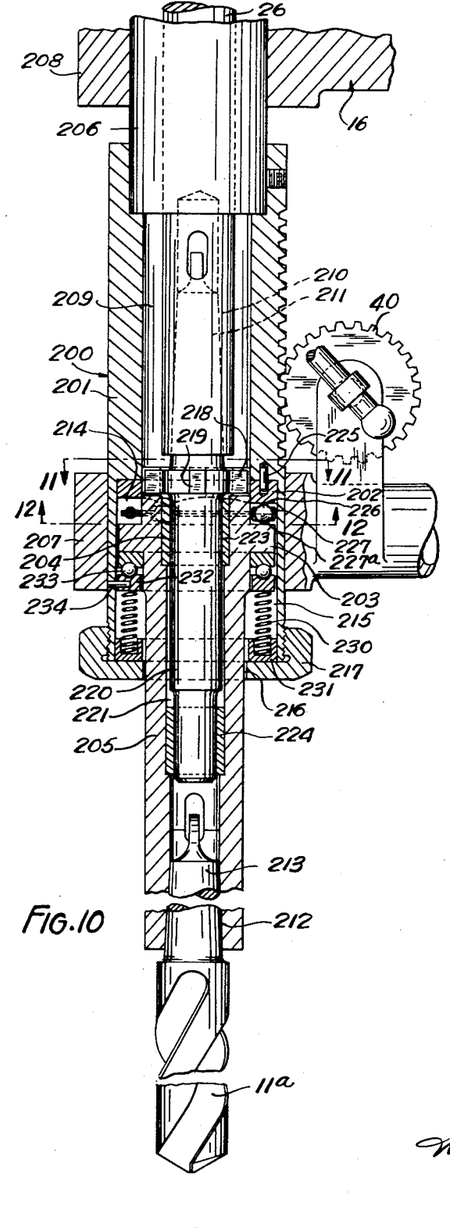
FIG. 10 is another axial section showing a sixth modified vibration generator and which is of the mechanical type.
Figure 11:
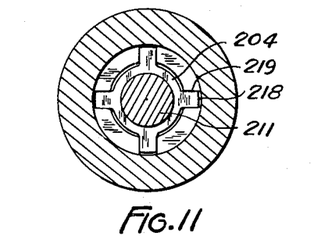
FIGS. 11 and 12 are transverse sectional views taken through the vibration generator of FIG. 10 as indicated by the section lines 11—11 and 12—12 thereof.
Figure 12:
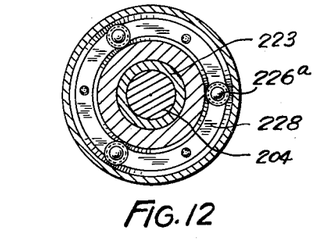

FIG. 10 of the drawings shows still another form of vibration generator 200 for imparting vibratory movement to a tool 11 while the latter is being rotated in cutting engagement with the workpiece 13. The vibration generator 200 is of the mechanical type and comprises a tubular housing 201, which also serves as a feed sleeve corresponding with the feed sleeve 34 of the machine 10, and a pair of vibrator members 202 and 203 in the housing in the form of co-operating annular cam and cam follower elements. The vibration generator 200 also comprises an adapter member 204 located in the housing 201 for driving co-operation with a hollow toolholder or spindle 205 which extends into the housing from the lower end thereof.

The housing 201 is a nonrotatable member mounted on the lower end of a quill shaft 206 so as to be axially movable and slidably guided in a pair of lower and upper bearings 207 and 208 of the machine frame 16. A drive shaft 26 extends through the quill shaft 206 into the chamber 209 of the housing 201 and has a tapered socket 210 in its lower end in which a tapered shank 211 of the adapter member 204 is wedgingly seated. The wedged engagement of the tapered stem 211 in the socket 210 connects the adapter member with the shaft 26 so as to be rotated thereby.

The tool spindle 205 is provided at the lower end thereof with a tapered socket 212 in which the tapered shank 213 of the tool 11$^a$ is wedgingly engaged to establish a driving connection between the tool spindle and tool. The upper end of the tool spindle 205 extends into a counterbored portion 215 of the housing 201 through an opening 216 of a lower cover member 217 of the housing. The upper end of the tool spindle 205 is provided with a group of circumferentially spaced axially extending slots or spline grooves 218 in which a corresponding group of lugs or spline teeth 219 of the adapter member 204 are engaged. The co-operating spline elements 218 and 219 provide an axially slidable driving connection between the adapter member 204 and the tool spindle 205 for transmitting torque to the latter from the drive shaft 26 while permitting axial shifting of the tool spindle in the housing 201.

The adapter member 204 includes a depending axial guide stem 220 which extends into a longitudinal passage 221 of the tool spindle 205 and on which the tool spindle is guided during the axial shifting thereof in the housing 201. For the purpose of this guiding action of the stem 220, the tool spindle is provided with axially spaced bushings 223 and 224 in the passage 221 and which are slidable on the stem.

The vibrator member 203 is an annular radial flange formed on, or connected with, the upper end of the tool spindle 205 adjacent the group of spline grooves 218 and is located in the housing 201 in an axially opposed relation to the vibrator member 202. An intervening annular space between the vibrator members 202 and 203 defines an annular raceway 214.

Figure 13:
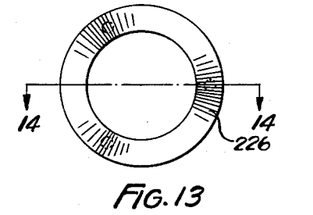
FIG. 13 is a bottom plan view of the cam ring of the vibration generator of FIG. 10 and showing the same in detached relation.
Figure 14:
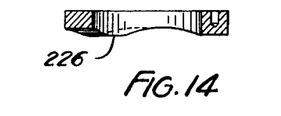
FIG. 14 is a sectional view through the cam ring taken on section line 14—14 of FIG. 13.

The vibrator member 202 is in the form of a cam ring disposed in the counterbore 215 of the housing 201 and nonrotatably secured to the housing as by means of pins 225. This cam ring has a cam profile facing axially toward the raceway 214 and comprising an annular group of cam lobes 226 presented toward the vibrator member 203. The vibrator member 203 acts as a follower means for the cam lobes 226 and co-operates therewith either by direct engagement or through the interposed ball means 227. In this instance the ball means 227 comprises a plurality of spherical bearing members or balls 227$^a$ disposed in an annularly spaced relation around the common rotation axis and maintained in such spaced relation by a suitable cage 228.

The follower member 203 and the ball means 227 are biased toward the cam ring 202 by a group of axially disposed compression springs 230 located in the lower end of the counterbore 215 in a circumferentially spaced relation therearound. The springs 230 have their outer or lower ends received in openings of a ring-shaped spring seat 231 lying against the transverse wall of the cover member 217 and have their inner or upper ends seated against the outermost race 232 of an antifriction thrust bearing 233 through which the thrust of these springs is applied to the follower member 203. The race 232 is preferably held in a nonrotatable relation relative to the ring-shaped spring seat 231 by being connected to the wall of the housing 201 as by means of the anchor pin 234.

From the construction of the vibration generator 200 and the arrangement of the components thereof as described above, it will be seen that when the tool 11$^a$ is rotated in cutting engagement with the workpiece 13 by driving torque transmitted from the shaft 26 through the adapter member 204 to the tool spindle 205, the follower member 203 will also be rotatably driven while the cam ring 202 is being held against rotation. The result of the relative rotation between the follower member 203 and the cam ring 202 will be to cause the ball means 226 to travel around in the raceway 214 by rolling on the follower member. This rotative movement of the ball means 227, while being pressed against the cam ring 202 by the action of the springs 230, will result in a rapid short-stroke vibratory movement of the tool spindle 205 and of the tool 11$^a$ by reason of the thrust reaction of the cam lobes 226 on the individual balls 227$^a$.

The vibratory movement produced by the co-operation of the ball means 227 with the cam ring 202 can have any desired frequency and amplitude depending upon the characteristics of the cam ring and the number of the individual balls 227$^a$ used. Thus, by increasing the number of the cam lobes 226 on the cam ring, and the axial height of these cam lobes, the frequency and amplitude of the vibratory movement of the tool spindle 205 can be suitably selected or varied. The vibration frequency can also be varied by varying the number and spacing of the balls 227$^a$ relative to the number and spacing of the cam lobes 226.

The vibration generator 200 described above is intended for use in the same location as the vibration generator 14 and for the accomplishment of the same beneficial results. The vibration generator 200 can be designed and operated so that the vibratory movement produced thereby is either a resonant vibratory movement or a nonresonant vibratory movement.

Figure 15:
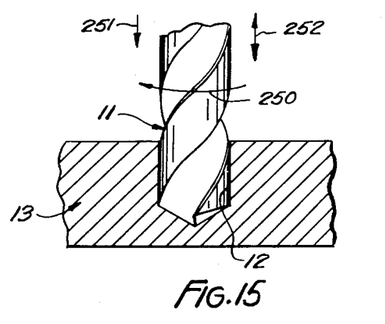
FIG. 15 is a fragmentary axial section showing the tool bit of the machine of FIG. 1 in cutting engagement with, penetrated into, the workpiece.

FIG. 15 of the drawings shows the cutting tool 11 of FIG. 1 in actual cutting engagement with the workpiece 13 and partially penetrated thereinto. As previously indicated herein, the tool 11 is shown by way of example as being a tool bit of the twist drill type.

Figure 16:
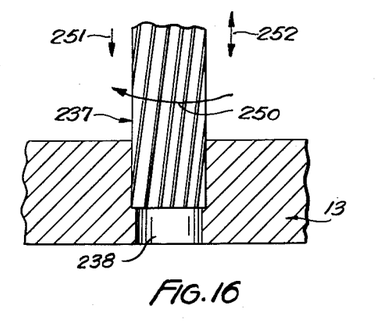
FIG. 16 is similar fragmentary axial section but showing a reaming tool in cutting engagement with the workpiece.

FIGS. 16 to 19, inclusive, of the drawings show other tools of the rotating type in cutting engagement with the workpiece 13 and which tools can be used in the machine 10 in place of the tool 11. The tool 237 of FIG. 16 is a reamer and is being used to ream the hole 238 of the workpiece 13.

Figure 17:
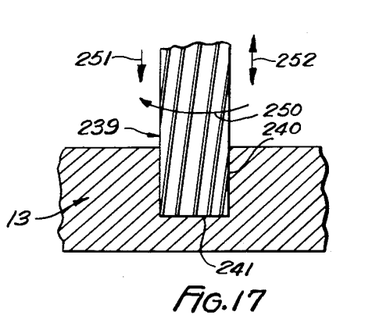
FIGS. 17, 18 and 19 are other such fragmentary axial sections in which the tools shown are, respectively, an end mill tool, a trepanning tool and a boring tool.

In FIG. 17 the tool 239 is an end mill and is being used to form an axial recess 240 in the workpiece 13.

Figure 18:
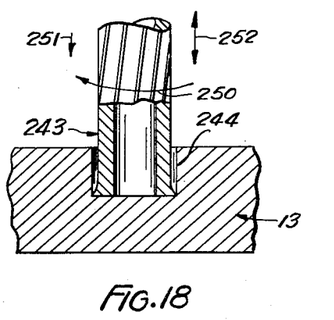

In FIG. 18 the tool shown is a trepanning tool or cutter 243 and is being used to form an annular recess or groove 244 in the workpiece 13.

Figure 19:
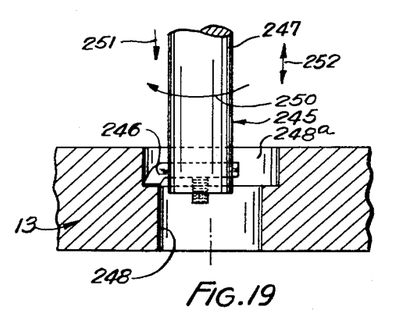

In FIG. 19 the tool shown is a boring tool 245 comprising a bit 246 mounted on a supporting stem or shaft 247 in a transverse relation thereto. The boring tool 245 is shown in FIG. 19 as being used in a boring operation for enlarging or finishing an opening or bore 248 of the workpiece 13 to the enlarged diameter or finished condition represented by the bore portion 248$^a$.

All of the tools 11, 237, 239, 243, and 245 shown in

FIGS. 15 to 19 inclusive, are of the kind having a cutting portion or portions and a supporting stem or shaft, and are rotatable about the axis of such stem or shaft for producing the desired material removal or cutting action on the workpiece. During the use of all of the tools of FIGS. 15 to 19 inclusive, the tool is subjected to the rapid short-stroke vibratory movement hereinabove described during the cutting action and by which the chip breaking and other advantageous results explained herein are achieved.

During the use of the tools of FIGS. 15 to 19 inclusive, in the method and apparatus of this invention the tool is rotated continuously in cutting engagement with the workpiece 13 as indicated by the directional arrow 250. Feeding movement is imparted to the tool in the direction indicated by the arrow 251 for maintaining the tool in cutting engagement with the workpiece and for advancing the tool thereinto. The direction of the vibratory movement for the tools of FIGS. 15 to 19 inclusive, is a vibratory movement along the rotation axis of the tools as indicated by the directional arrow 252.

In the case of tools which have a cutting edge or edges on the side thereof, such as the reamer 237 of FIG. 16, the end mill 239 of FIG. 17 and the boring tool 245 of FIG. 19, it will be recognized that such tools can have a transverse feeding movement instead of or in addition to the axial feeding movement 251.

Although the tools of FIGS. 15 to 19 inclusive, are all shown as being of the drill type it will be understood of course that the method and apparatus of this invention are also usable with rotating tools to which the vibratory movement may be imparted in a direction transverse to the rotation axis and likewise it will be undersood that, although FIGS. 1, 2 and 15 to 19 inclusive, show a feeding movement which is an axial movement of the tool toward the workpiece, the feeding movement can also be accomplished by a movement of the workpiece relative to the tool.

FIG. 20 shows an additional modified form of vibration generator 255 of a construction and intended use similar to that of the above-described vibration generator 14 of FIGS. 1 and 2 but in which fluid pressure is supplied to only one end of the cylinder 53, in this case, the upper cylinder chamber 53ª. The double-acting character of the vibration generator 255 is obtained by the action of the pressure fluid supplied to the chamber 53ª in moving the piston 56 in one direction and the action of the compression spring 60 in moving the piston in the opposite direction.

In the vibration generator 255 only one annular groove 66 is needed in the collar 68 for supplying pressure fluid to, and exhausting fluid from, the cylinder chamber 53ª through the shaft passages 61 and 62. Likewise, only one flexible conduit 77ª is needed for connecting the reversing valve 75 with the single annular groove 66 of the collar 68.

The vibration generators 85 and 170 of FIGS. 3 and 9 are double-acting in character by reason of the provision of fluid pressure supply passages extending to both ends of the cylinder 53; and consequently, the compression spring 60 could be omitted. Likewise it will be recognized that when the spring 60 is used, the pressure fluid supply connection to the cylinder chamber containing this spring can be omitted as has been illustrated in FIG. 20 for the vibration generator 255.

From the accompanying drawings and the foregoing description it will now be readily understood that this invention provides novel apparatus for the removal of material from a workpiece by cutting, machining, drilling, reaming, milling, trepanning, boring, or other such procedures in a highly effective manner as the result of the rapid vibratory movement of the tool during the rotation thereof in a material removing or cutting engagement with the workpiece. Since many of the important advantages resulting from the apparatus of this invention have already been mentioned hereinabove, they need not be further summarized at this point.

Although the apparatus of this invention have been illustrated and described herein to a somewhat detailed extent it will be understood, of course, that the invention is not to be regarded as being correspondingly limited in scope, but includes all changes and modifications coming within the terms of the claims hereof.

Having described my invention, I claim:

1. In apparatus for removing material from a workpiece, workholder means for supporting the workpiece, a rotatable cutting tool, drive means operable to rotate the tool, feed means operable to produce axial feeding movement of the tool for maintaining the latter in cutting relation to the workpiece, a vibrator device located between and connected with said drive means and tool for transmitting rotative and axial feeding movements to the latter, said vibrator device comprising expansible-chamber pressure fluid responsive vibration producing means effective on the tool for producing a short-stroke rapid axial vibratory movement thereof during the cutting operation, and means for supplying pressure fluid to said responsive means.

2. In apparatus for removing material from a workpiece, workholder means for supporting the workpiece, a rotatable cutting tool, drive means operable to rotate the tool, feed means operable to produce axial feeding movement of the tool for maintaining the latter in cutting relation to the workpiece, a vibrator device located between and connected with said drive means and tool for transmitting rotative and axial feeding movements to the latter, said vibrator device comprising electromagnetically operable vibration producing means effective on said tool for causing a short-stroke rapid axial vibratory movement thereof, and means for electrically energizing said vibration producing means.

3. In cutting apparatus for removing material from a workpiece, workholder means for supporting the workpiece, a rotatable cutting tool, drive means operable to rotate the tool, means operable to produce relative feeding movement between the workpiece and tool for maintaining the latter in cutting relation to the workpiece, vibration producing means connected with said tool and comprising a pressure fluid device of the kind having expansible chamber means, pressure fluid supply means connected with said device, and automatic control valve means controlling the operation of said device by the pressure fluid being supplied thereto.

4. In cutting apparatus for removing material from a workpiece, workholder means for supporting the workpiece, a rotatable cutting tool, drive means operable to rotate the tool, means operable to produce relative feeding movement between the workpiece and tool for maintaining the latter in cutting relation to the workpiece, vibration producing means connected with said tool and comprising cooperating cylinder and piston members and fluid chambers in the cylinder member on opposite sides of the piston member, and pressure fluid supply and return means connected with said chambers and including reversing valve means operable to reverse the flow direction for the fluid communication with said chambers.

5. In cutting apparatus for removing material from a workpiece, workholder means for supporting the workpiece, a tool having a stem and a cutting portion engageable with the workpiece, driving means for the tool, feeding means operable to produce relative feeding movement between the workpiece and tool for maintaining the tool in cutting relation to the workpiece, vibrator means connected between said driving means and stem for transmitting cutting movement to the tool and operable to impart a rapid vibratory movement to said cutting portion through said stem, said vibrator means comprising cooperating relatively movable vibrator members, one of said vibrator members comprising a housing having thrust means therein and the other vibrator member being located in said housing in a substantially opposed relation to said thrust means, said other vibrator member and said thrust means having relative closing and separating movement along the axis of said stem for producing the vibratory movement in response to vibration power medium supplied to said vibrator means, and vibration power medium supply means extending to said vibrator means.

6. Cutting apparatus as defined in claim 5 wherein said one vibrator member comprises a cylinder and said other vibrator member comprises a piston operable in said cylinder, and wherein said vibration power medium supply means comprises fluid pressure supply means connected with said cylinder.

7. Cutting apparatus as defined in claim 5 wherein said housing has fluid pressure and exhaust chambers therein and communication between said chambers is controlled by cooperating valve and valve seat elements formed respectively by said other vibrator member and said abutment means, and wherein said vibration power medium supply means is a fluid pressure supply means connected with said fluid pressure chamber.

8. Cutting apparatus as defined in claim 5 wherein said other vibrator member comprises an electromagnet and said abutment means comprises an armature responsive to energization of said electromagnet, and wherein said vibration power medium supply means comprises electric current supply means connected with said electromagnet.

9. In cutting apparatus for removing material from a workpiece, workholder means for supporting the workpiece, a tool having a stem and a cutting portion engageable with the workpiece, rotatable driving means connected with said stem for imparting a rotary cutting movement to the tool, feeding means operable to produce relative feeding movement between the workpiece and tool for maintaining the tool in cutting relation to the workpiece, vibration producing means comprising fluid pressure responsive cooperating cylinder and piston members effective to impart a short-stroke rapid vibratory movement to said cutting portion through said stem axially of the latter, pump means connected with said rotatable driving means to be driven thereby, and passage means connecting the cylinder member with said pump means so as to be supplied with pressure fluid by the latter.

10. Cutting apparatus as defined in claim 9 wherein said pump means comprises a rotary pump having fluid intake and delivery passages connected with the cylinder member of said vibration producing means through a flow-reversing valve means.

11. Cutting apparatus as defined in claim 9 wherein said pump means is of the plunger type and has reciprocable plunger means driven from said rotatable driving means through rotary-to-reciprocating motion converting means.

12. In cutting apparatus of the character described, workholder means adapted to support a workpiece, a rotatable drilling tool having a stem and a cutting portion, toolholder means engaging said stem, a rotatable drive means, feeding means operable to produce relative feeding movement between the workpiece and tool for maintaining the latter in cutting relation to the workpiece, and vibrator means connected between said drive means and said toolholder means for transmitting rotary movement to the latter for driving said tool, said vibrator means comprising cooperating relatively movable vibration power medium responsive vibrator members effective to impart a rapid vibratory movement to said tool during the rotation thereof and along the axis of said stem.

13. In cutting apparatus of the character described, workholder means adapted to support a workpiece, a rotatable drilling tool having a stem and a cutting portion, toolholder means engaging said stem, a rotatable drive means, feeding means operable to produce relative feeding movement between the workpiece and tool for maintaining the latter in cutting relation to the workpiece, housing means connected with said drive means and containing a cylinder, a piston reciprocable in said cylinder and connected with said toolholder means, means preventing relative rotation between said housing means and piston, said housing means and piston being rotatable with said drive means on a common axis for imparting rotation to said toolholder means and tool, the reciprocation of said piston in said cylinder being effective to vibrate said tool along said common axis during the rotation of the tool, and means for supplying pressure fluid vibration medium to said cylinder for actuating said piston including passages in said housing means and communicating with the cylinder.

14. In cutting apparatus of the character described, workholder means adapted to support a workpiece, a rotatable drilling tool having a stem and a cutting portion, toolholder means engaging said stem, a rotatable drive means, feeding means operable to produce relative feeding movement between the workpiece and tool for maintaining the latter in cutting relation to the workpiece, hollow means connected with said drive means and containing a cylinder, a piston reciprocable in said cylinder and connected with said toolholder means, means preventing relative rotation between said hollow means and piston, said hollow means and piston being rotatable with said drive means on a common axis for imparting rotation to said tool, the reciprocation of said piston in said cylinder being effective to vibrate said tool along said common axis during the rotation of the tool, a pump housing associated with said drive means and having passage means extending to said cylinder for flow of fluid vibration medium between the pump housing and cylinder to actuate said piston with a vibratory movement, and pumping means connected with said drive means and operable in said pump housing to produce said flow of said medium.

15. Cutting apparatus as defined in claim 14 wherein said pumping means comprises cooperating gear-type pump elements one of which is connected with said drive means.

16. Cutting apparatus as defined in claim 14 wherein said pumping means comprises cooperating gear-type pump elements one of which is connected with said drive means, and wherein reversing valve means responsive to relative movement between said drive means and pump housing controls the direction of flow of said medium through said passage means.

17. Cutting apparatus as defined in claim 14 wherein said pumping means comprises plunger means reciprocable in said pump housing, and wherein cam means actuated by said drive means causes the reciprocation of said plunger means.

18. In cutting apparatus of the character described, workholder means adapted to support a workpiece, a rotatable drilling tool having a stem and a cutting portion, toolholder means engaging said stem, a rotatable drive means, feeding means operable to produce relative feeding movement between the workpiece and tool for maintaining the latter in cutting relation to the workpiece, housing means connecting said toolholder means with said drive means for rotation on a common axis and containing a fluid exhaust chamber, cooperating valve members in said housing means substantially on said common axis and defining a pressure chamber therebetween whose communication with said exhaust chamber is controlled by said valve members, and fluid pressure vibration medium supply means connected with said pressure chamber, said valve members having relative opening and closing vibratory movement in response to fluid pressure variations in said pressure chamber for causing a vibratory movement to be imparted to said tool along said common axis.

19. Cutting apparatus as defined in claim 18 wherein one of said valve members comprises a valve seat and the other valve member comprises an expansible and contractible flexible member having a normally valve-closed position in engagement with said seat.

20. Cutting apparatus as defined in claim 18 wherein one of said valve members comprises a valve cylinder and the other valve member comprises a valve plunger operable in said valve cylinder and having a normally valve-closed position therein.

21. In cutting apparatus of the character described, workholder means adapted to support a workpiece, a rotatable drilling tool having a stem and a cutting portion, toolholder means engaging said stem, a rotatable drive means, feeding means operable to produce relative feeding movement between the workpiece and tool for maintaining the latter in cutting relation to the workpiece, connecting means connecting said toolholder means with said drive means for rotation on a common axis, said connecting means having a vibratory fork portion providing for a resonant vibration frequency, vibrator means on said connecting means comprising cooperating vibrator members in an opposed relation substantially on said rotation axis and subject to relative closing and separating vibratory movement in response to vibration power medium supplied to said vibrator means for causing vibration of said fork portion and tool substantially at said resonant frequency, and vibration power medium supply means connected with said vibrator means.

22. Cutting apparatus as defined in claim 21 wherein said vibrator members comprise an electromagnet and an armature for the electromagnet, and wherein said vibration power medium supply means comprises electric current supply means connected with said electromagnet.

23. Cutting apparatus as defined in claim 21 wherein said connecting means is a housing containing an exhaust fluid chamber and said vibrator members comprise a valve cylinder and a valve plunger operable in the valve cylinder and cooperating with the latter to define a pressure chamber, the communication of said pressure chamber with said exhaust chamber being controlled by the operation of said valve plunger in said valve cylinder, and wherein said vibration power medium supply means comprises fluid pressure supply means connected with said pressure chamber.

24. In cutting apparatus of the character described, workholder means adapted to support a workpiece, a rotatable drilling tool having a stem and a cutting portion, toolholder means engaging said stem, a rotatable drive means, feeding means operable to produce relative feeding movement between the workpiece and tool for maintaining the latter in cutting relation to the workpiece, vibrator means connected between said drive means and said toolholder means for transmitting rotary movement to the latter for driving said tool, said vibrator means comprising co-operating relatively movable fluid pressure responsive vibrator members effective to impart a rapid vibratory movement to said tool during the rotation thereof and along the axis of said stem, and fluid pressure supply pump means operable by said drive means during the rotation thereof and connected with said vibrator means for supplying fluid pressure to the latter.

References Cited in the file of this patent

UNITED STATES PATENTS

| | | |
|---|---|---|
| 2,103,137 | Basgan | Dec. 21, 1937 |
| 2,128,675 | Indge | Aug. 30, 1938 |
| 2,453,136 | Karweit | Nov. 9, 1948 |